United States Patent
Kovar et al.

(10) Patent No.: US 8,887,284 B2
(45) Date of Patent: Nov. 11, 2014

(54) EXFILTRATION TESTING AND EXTRUSION ASSESSMENT

(75) Inventors: Matthew Kovar, Marblehead, MA (US); Joseph Bai, Southborough, MA (US)

(73) Assignee: Circumventive, LLC, Marblehead, MA (US)

( * ) Notice: Subject to any disclaimer, the term of this patent is extended or adjusted under 35 U.S.C. 154(b) by 56 days.

(21) Appl. No.: 13/370,716

(22) Filed: Feb. 10, 2012

(65) Prior Publication Data

US 2012/0210433 A1 Aug. 16, 2012

Related U.S. Application Data

(60) Provisional application No. 61/462,963, filed on Feb. 10, 2011.

(51) Int. Cl.
 *G06F 21/00* (2013.01)
 *H04L 29/06* (2006.01)
 *G06F 21/57* (2013.01)

(52) U.S. Cl.
 CPC ...... *G06F 21/577* (2013.01); *G06F 2221/2101* (2013.01); *H04L 63/1433* (2013.01); *H04L 63/0227* (2013.01)
 USPC ................ 726/25; 726/11; 726/12; 709/220; 709/224; 709/228; 709/229

(58) Field of Classification Search
 USPC ............................... 726/22, 25; 709/220, 228
 See application file for complete search history.

(56) References Cited

U.S. PATENT DOCUMENTS

| 6,768,992 | B1* | 7/2004 | Jolitz | 1/1 |
| 7,832,006 | B2 | 11/2010 | Chen et al. | |
| 2003/0235184 | A1* | 12/2003 | Dorenbosch et al. | 370/352 |
| 2004/0259640 | A1* | 12/2004 | Gentles et al. | 463/42 |
| 2005/0240991 | A1* | 10/2005 | Dombkowski et al. | 726/11 |
| 2008/0320152 | A1* | 12/2008 | Padmanabhan et al. | 709/228 |
| 2010/0082777 | A1* | 4/2010 | Montgomery et al. | 709/220 |

OTHER PUBLICATIONS

"Host-Based Data Exfiltration Detection via System Call Sequences"; by B Jewell, J Beaver; The Proceedings of the 6th International Conference; 9 pages, IEEE 2011.*

* cited by examiner

*Primary Examiner* — Jason Lee
(74) *Attorney, Agent, or Firm* — Bainwood Huang

(57) ABSTRACT

An improved technique employs an automated agent inside the network perimeter, which generates and sends data packets to a listener outside the network perimeter. Along these lines, the automated agent generates data packets over a specified range of security parameters including port number, payload format, and communications protocol. The agent attempts to send these data packets across the network boundary through a firewall at an egress or other point of the network. The listener receives the data packets and analyzes the payload content of each received data packet for each value of the security parameters (e.g., port number, file type, and protocol). The listener then sends the results of the analysis to a report generator, which summarizes the analysis for an administrator of the network.

15 Claims, 6 Drawing Sheets

EXFILTRATION TESTING AND EXTRUSION ASSESSMENT

CROSS REFERENCE TO RELATED APPLICATIONS

This application claims the benefit, under 35 U.S.C. §119 (e), of U.S. Provisional Patent Application No. 61/462,963 filed Feb. 10, 2011, entitled "CIRCUMVENTIVE BREAK-OUT: EXFILTRATION TESTING AND EXTRUSION ASSESSMENT," the teachings and contents of which are incorporated by reference in their entirety.

BACKGROUND

Computers located within a perimeter of a network communicate with computers outside the boundary of the network in part by sending data packets outbound from the network. The data packets contain information, such as textual messages and multimedia, and metadata, such as a destination addresses and port numbers.

Network administrators employ devices such as firewalls built into routers, certain computer operating systems, and other software, to control information in data packets sent and received over a network. For example, suppose the network includes systems storing sensitive credit card data. A firewall on such a network may have rules to stop outgoing data packets that include textual information resembling credit card numbers (i.e., containing 16 consecutive digits), as such textual information is likely to be a credit card number that should not be sent in an outbound packet as part of an email.

Conventional network security systems, such as network sniffers, test such firewall devices by attempting to send information containing sensitive data in an outbound data packet through the firewall and verifying whether the data packet was blocked by firewall. If the data packet was not blocked, the conventional network security system may adjust the rules of the firewall in order to ensure that data packets containing the sensitive data, or similar data, are blocked in subsequent tests.

SUMMARY

Unfortunately, conventional network security systems are vulnerable to security breaches from inside a network boundary. For example, conventional network security systems are often programmed according to the assumption that the user is acting benignly. Along these lines, consider that, a given node on a network has 65,535 port numbers associated with that node, as well as other channels associated with other protocols (e.g., TCP, UDP, ICMP). As is well known, port 80 is associated with HyperText Transfer Protocol (HTTP); this port, however, can be misused by fraudsters inside the network boundary to open a connection using a different protocol, such as File Transfer Protocol (FTP). In many cases, sensitive data can be then moved undetected through the firewall.

In contrast the conventional network security systems, in which potential security holes inside a network perimeter can lead to sensitive information being leaked in outbound data packets, an improved technique employs an automated agent inside the network boundary, which generates and sends data packets to a listener outside the network boundary. Along these lines, the automated agent generates data packets over a specified range of security parameters including port number, payload format, and communications protocol. The agent attempts to send these data packets across the network boundary through a firewall at an egress or other point of the network. The listener receives the data packets and analyzes the payload content of each received data packet for each value of the security parameters (e.g., port number, payload format, and communications protocol). The listener then sends the results of the analysis to a report generator, which summarizes the analysis for an administrator of the network.

Advantageously, the improved technique provides a complete picture of outbound vulnerabilities for a network and provides a prescription for minimizing the risk of sensitive data being improperly transmitted. Content within data packets generated by the agent is typically in the same form as the sensitive data, e.g., credit card numbers, social security numbers, computer software code, etc. Further, the listener is designed to exhaustively analyze data packets generated by the agent; the listener is thus able to provide a complete analysis of the security status of the network boundary. Rather than requiring a network administrator react to improper transmissions of sensitive data after the fact, the improved technique provides instructions on how to plug any holes in an outbound network security infrastructure before any improper transmissions of sensitive data occurs.

One embodiment of the improved technique is directed to a method of testing a network boundary for vulnerabilities to outbound traffic. The method includes generating, on a first side of the network boundary, a set of data packages including simulated restricted content. The method also transmitting the set of data packages across the network boundary. The method further includes receiving the set of data packages on a second side of the network boundary. The method further includes performing an analysis operation on the set of data packages, including verifying whether the simulated restricted content of the set of data packages changed between being generated on the first side of the network boundary and being received on the second side of the network boundary, to produce a set of verification results.

Additionally, some embodiments of the improved technique are directed to a system for testing a network boundary for vulnerabilities to outbound traffic. The system includes a network interface coupled to a network, a memory and processor coupled to the memory, the processor configured to carry the above method of testing a network boundary for vulnerabilities to outbound traffic.

Furthermore, some embodiments of the improved technique are directed to a computer program product having a non-transitory computer readable storage medium which stores code including a set of instructions to carry out the above method of testing a network boundary for vulnerabilities to outbound traffic.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique employs an automated agent inside the network perimeter, which generates and sends data packets to a listener outside the network perimeter. Along these lines, the automated agent generates data packets over a specified range of security parameters including port number, payload format, and communications protocol. The agent attempts to send these data packets across the network boundary through a firewall at an egress or other point of the network. The listener receives the data packets and analyzes the payload content of each received data packet for each value of the security parameters (e.g., port number, file type, and protocol). The listener then sends the results of the analysis to a report generator, which summarizes the analysis for an administrator of the network.

Advantageously, the improved technique provides a complete picture of outbound vulnerabilities for a network and provides a prescription for minimizing the risk of sensitive data being improperly transmitted. Content within data packets generated by the agent is typical of the form of the sensitive data, e.g., credit card numbers, social security numbers, computer software code, etc. Further, the listener is designed to exhaustively analyze data packets generated by the agent; the listener is thus able to provide a complete analysis of the security status of the network boundary. Rather than requiring a network administrator react to improper transmissions of sensitive data after the fact, the improved technique provides instructions on how to plug any holes in outbound network security infrastructure before any improper transmissions of sensitive data occur.

Figure 1:
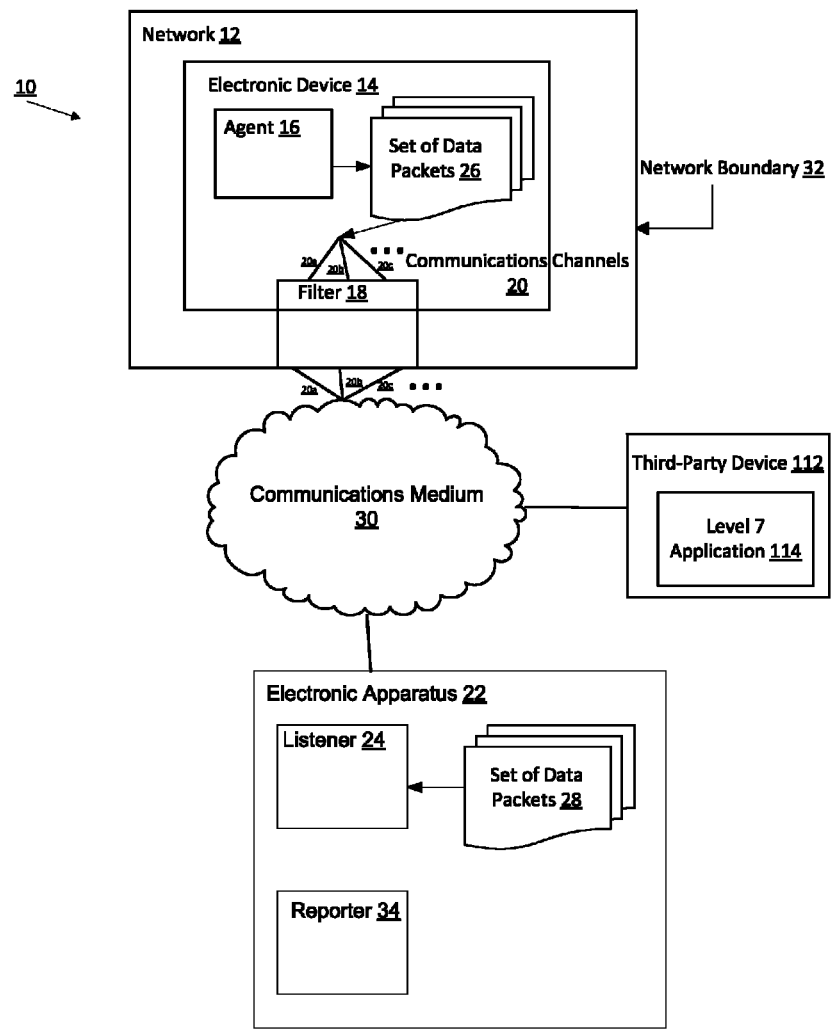
FIG. 1 is a schematic diagram illustrating an electronic environment for carrying out the improved technique.

FIG. 1 illustrates an electronic environment 10 for carrying out the improved technique. Electronic environment 10 includes network 12 having a boundary 32 inside of which electronic device 14 is located, communications medium 30, and electronic apparatus 22 located outside of network boundary 32.

Communication medium 30 provides network connections between network 12 and electronic apparatus 22. Communications medium 30 may implement a variety of protocols such as TCP/IP, UDP, ATM, ICMP, Ethernet, Fibre Channel, combinations thereof, and the like. Furthermore, communications media 30 may include various components (e.g., cables, switches/routers, gateways/bridges, NAS/SAN appliances/nodes, interfaces, etc.). Moreover, the communications medium 30 is capable of having a variety of topologies (e.g., queue manager-and-spoke, ring, backbone, multi drop, point to-point, irregular, combinations thereof, and so on).

Network 12 provides connections between electronic device 14 and communications medium 30; typically, network 12 takes the form of a private or virtual private, corporate network hosting sensitive data. Such a network as network 12 may include a public or private cloud and may host dedicated applications and infrastructure and any other data storing environments. Network 12 may implement a variety of protocols such as TCP/IP, UDP, ATM, ICMP, Ethernet, Fibre Channel, combinations thereof, and the like. Furthermore, network 12 may include various components (e.g., cables, switches/routers, gateways/bridges, NAS/SAN appliances/nodes, interfaces, etc.). Moreover, network 12 is capable of having a variety of topologies (e.g., queue manager-and-spoke, ring, backbone, multi drop, point to-point, irregular, combinations thereof, and so on).

Network 12 further includes a network boundary 32 which defines an imaginary line between those devices which are trusted with data sensitive to an organization, and those devices in the general public. In some arrangements, there is a DMZ network straddling the network boundary 32.

Electronic device 14 is constructed and arranged to generate a set of data packets 26 in accordance with instructions provided in an agent 16, and send the set of data packets 26 outbound to a listener 24. Electronic device 14 preferably takes the form of a server; nevertheless, electronic device 14 can be any device that generates data packets and is capable for forming a network connection, such as a laptop computer, smartphone, PDA, tablet computer, network appliance, and the like. Electronic device 14 includes the agent 16 which generates the set of data packets 26.

Agent 16 is constructed and arranged to generate the set of data packets 26. Agent 16 preferably takes the form of software; nevertheless, agent 16 may take the form of an electronic appliance connected to electronic device 14. Agent 16 may generate all possible values of a set of parameters, includes a port number, a payload format, and a communications protocol, for example, as well as patterns of simulated restricted content for the payload of the data packets. In principle, agent 16 generates packets configured for all 65,535 port numbers, as well as other channels associated with other protocols (e.g., TCP, UDP, ICMP), all imaginable payload formats (e.g., rich text format, Microsoft Word™, Microsoft Powerpoint™, Mathematica files, etc.), as well as ATM, and other layer 3 and layer 2 protocols. In some arrangements, agent 16 generates the set of data packets 26 for specific layer 7 applications (e.g., Facebook, Skype, SQL, etc.) In some arrangements, agent 16 generates the set of data packets 26 for a specified range of parameter values. The specification may come from a third party (options specified when downloading the agent 16 from a vendor) in the form of an XML file, although other forms are possible. For example, the specification may have agent 16 generate data packets with port numbers between 1 and 1024.

It should be understood that data packets represent only one possible form of data that can be transmitted across network boundary 32. For example, data sent under the User Datagram Protocol (UDP) is sent in packages known as datagrams that are distinguished from data packets, although both types of packages have headers and payloads. Nevertheless, unless otherwise specified, packages of data will be referred to as "data packets"; each includes a header and a payload.

In some arrangements, electronic device 14 further includes a filter 18 which scans the payload content of each outbound data packet for content patterns embedded in a set of rules. For example, filter 18 takes the form of firewall software residing on electronic device 14. Further, a content pattern embedded in the set of rules can take the form of 16 consecutive numerals, which typically represents a credit card number. In such a case, such a content pattern is redacted from the payload and the resulting data packet sent with the rest of the data packets in set 26, resulting in the set of data packets 28.

It should be understood that filter 18 may or may not make changes to content directly. In some arrangements, filter 18 detects particular content and directs data packets containing that content to a third-party device configured to make changes to the content.

In other arrangements, filter 18 is an electronic appliance such as a router, separate from electronic device 14, located at an egress point of network 12. Such an electronic appliance has firewall software built in that applies a set of rules in scanning the payload of each data packet that passes through the egress point of network 12.

Electronic device 14 further includes a set of communications channels 20a, 20b, 20c, . . . (communications channels 20) over which set of data packets 26 are sent to communications medium 30. Communications channels 20 represent mathematical constructs over which data packets may be sent under various protocols to communications medium 30. In some arrangements, each communications channel 20a, 20b, 20c, . . . include one of 65,535 port numbers. Data packets sent as email are conventionally sent under Simple Mail Transfer Protocol (SMTP) over port 25, while data packets sent via HyperText Transfer Protocol are conventionally sent over port 80. Nevertheless, electronic device 14 will, for example, send a data packet having a protocol of SMTP over a communications channel having a port number of 80.

Electronic apparatus 22 is outside of network boundary 32 and is constructed and arranged to receive the set of data packets 28. Electronic apparatus 22 preferably takes the form of a server; nevertheless, electronic apparatus 22 can be any device that generates data packets and is capable for forming a network connection, such as a laptop computer, smartphone, PDA, tablet computer, network appliance, and the like. The set of data packets 28 includes data packets of the set of data packets 26, some of which have been had their payload content altered by filter 18. Electronic apparatus 22 further includes listener 24 and reporter 34.

Listener 24 typically takes the form of software residing within electronic apparatus 22, although in some arrangements, listener 32 may be an electronic appliance attached to electronic apparatus 22. Listener 24 performs an analysis operation on the set of data packets 28, including verifying whether the payload content of the set of data packages 28 changed between being generated on electronic device 14 and being received on electronic apparatus 22. To this effect, listener 24 accesses the payload content of the set of data packets 26 and compares that payload content with the payload content of the set of data packets 28.

In some arrangements, listener 24 also scans headers of the set of data packets 28 for values of a set of parameters. The set of parameters includes a port number, a payload format, and a communications protocol, for example. Along these lines, suppose that agent 16 generates a data packet having a port number of 21, a payload format of .RTF (rich text format), and a communications protocol of TCP and SMTP. Suppose further that the data packet was sent over the communications channel 20a, which includes the port number 80 representing HyperText Transfer Protocol. Listener 24 compares the payload content of the data packet with the original payload content as generated by agent 16 for the data packet defined by these parameter values.

Reporter 34 receives results of the analysis operation performed by listener 24 and presents a report to a network administrator for network 12. Reporter 34 is preferably software residing within electronic apparatus 22; nevertheless, reporter 34 may take the form of an electronic appliance connected to electronic apparatus 22.

Figure 2A:
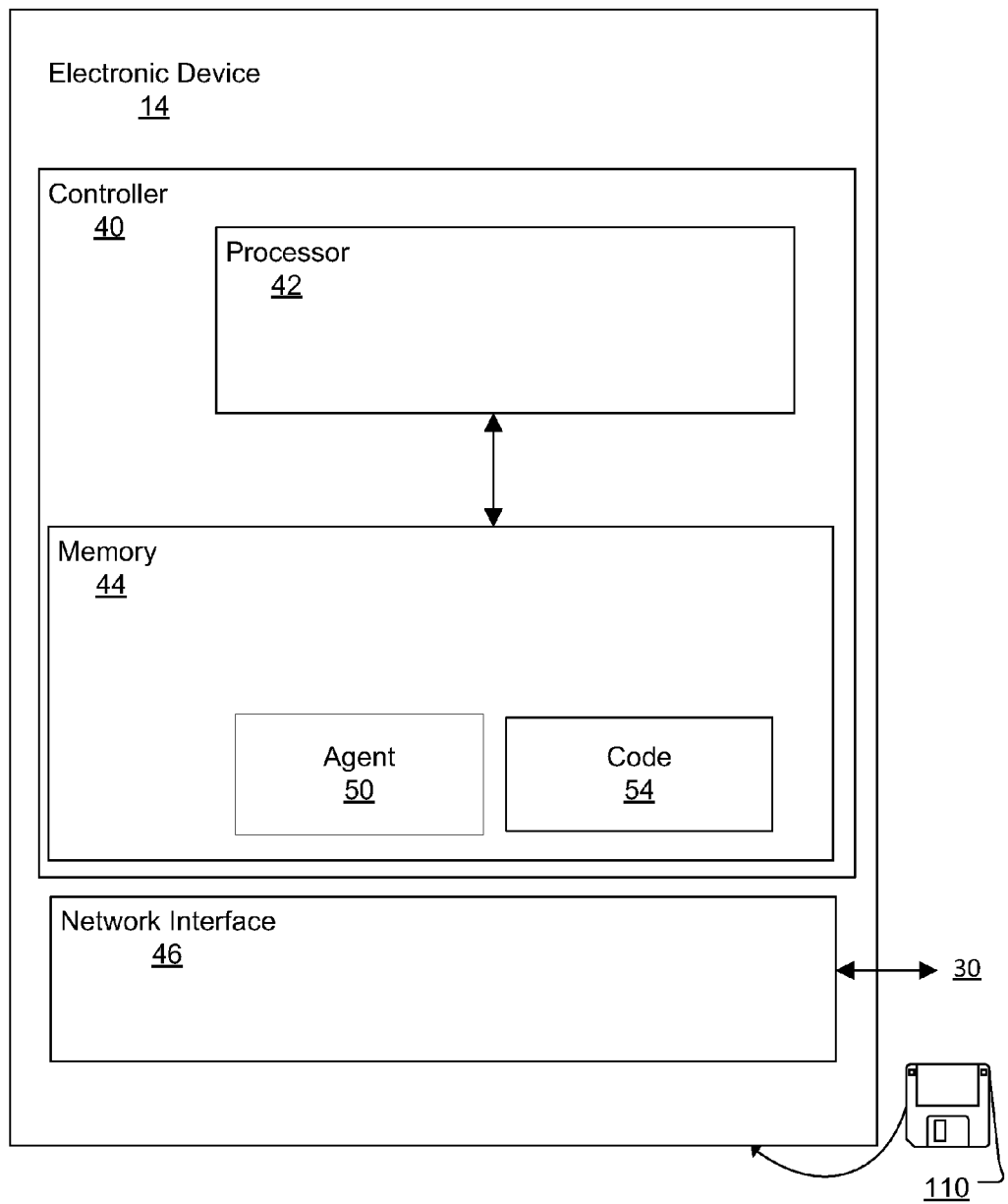
FIG. 2*a* is a schematic diagram illustrating the electronic device on the first side of the network boundary within the electronic environment shown in FIG. 1.
Figure 2B:
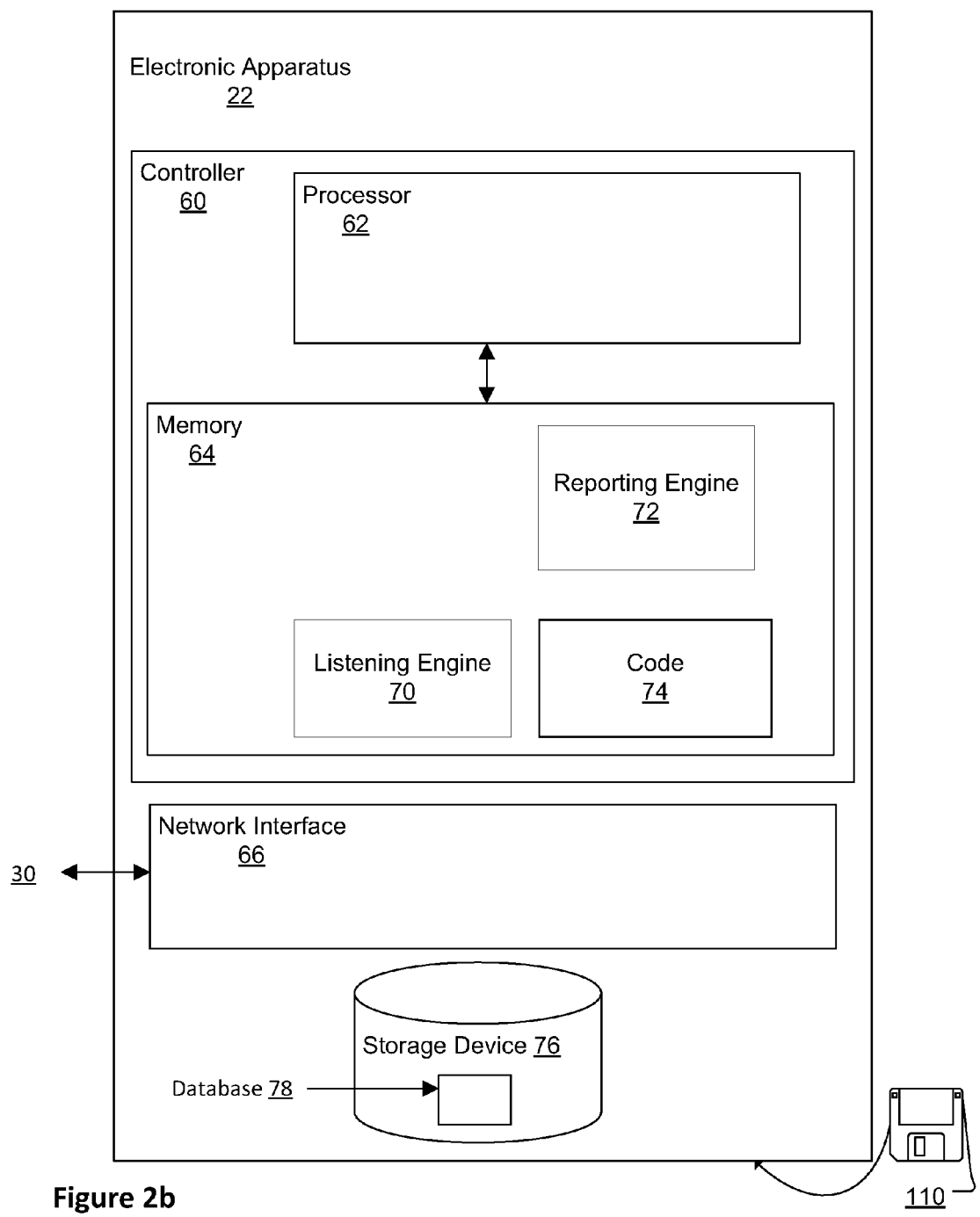
FIG. 2*b* is a schematic diagram illustrating the electronic apparatus on the second side of the network boundary within the electronic environment shown in FIG. 1.

Further details concerning electronic device 14 and electronic apparatus 22 are considered with respect to FIG. 2a and FIG. 2b.

FIG. 2a illustrates components of electronic device 14. Electronic device 14 includes a controller 40 which in turn includes processor 42 and a memory 44, and a network interface 46.

Memory 44 is configured to store agent software 50 which includes instructions to generate the set of data packets 26 and transmit the set of data packages 26 across the network boundary 32. Memory 44 is further configured to store code 54 which includes instructions for operating system commands. Memory 44 generally takes the form of, e.g., random access memory, flash memory or a non-volatile memory.

Processor 42 takes the form of, but is not limited to, Intel or AMD-based MPUs, and can include a single or multi-cores each running single or multiple threads. Processor 42 is coupled to memory 44 and is configured to execute instructions stored in memory 44.

Network interface 46 is constructed and arranged to send and receive data over communications medium 30. Specifically, network interface 46 is configured to send the set of data packets 26 from electronic device 14 to communications medium 30.

FIG. 2b illustrates components of electronic apparatus 22. Electronic apparatus 22 includes a controller 60 which in turn includes processor 62 and a memory 64, a network interface 66, and storage device 76.

Memory 64 is configured to store listening engine software 70 which includes instructions to receive the set of data packets 28 and perform an analysis operation on the set of data packets 28. Memory 64 is also configured to store reporting engine software 72 which is configured to generate reports based on results of the analysis operation. Memory 64 is further configured to store code 74 which includes instructions for operating system commands. In some arrangements, code 74 also includes agent software 50, which in turn includes instructions to generate the set of data packets 26. Memory 64 generally takes the form of, e.g., random access memory, flash memory or a non-volatile memory.

Processor 62 takes the form of, but is not limited to, Intel or AMD-based MPUs, and can include a single or multi-cores each running single or multiple threads. Processor 62 is coupled to memory 64 and is configured to execute instructions stored in memory 64.

Network interface 66 is constructed and arranged to send and receive data over communications medium 30. Specifically, network interface 66 is configured to receive the set of data packets 28 from electronic device 14 over communications medium 30.

Storage device 76 provides storage for data used in the analysis operation, such as set of data packets 28; in some arrangements, storage device 76 also provides storage for set of data packets 26. Storage device 76 further provides storage for the results of the analysis operation.

During operation, processor 42 (see FIG. 2a) generates, via agent 16 (see FIG. 1), the set of data packets 26. Typically, the data packets 26 are each part of a set of files having some format; this format is the payload format of the content in the data packet. In some arrangements, agent 16 reads a specification from, e.g., an XML file, which provides instructions concerning a set of parameters over which agent 16 generates the set of data packets 26, as described above. In other arrangements, the payload of the data packet includes content having several different file formats.

Figure 3:
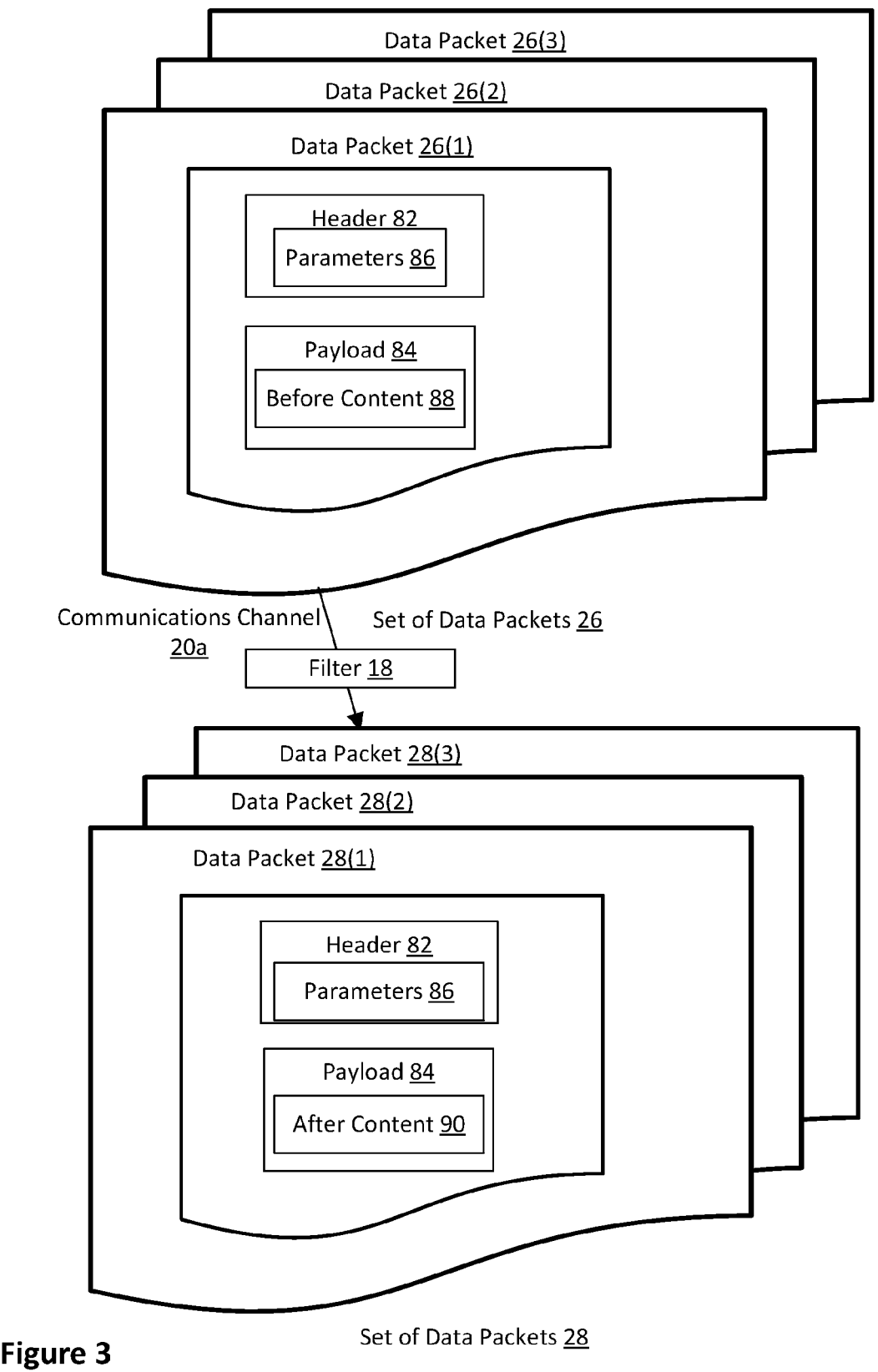
FIG. 3 is a diagram illustrating a first set of data packets and a second set of data packets within the electronic environment shown in FIG. 1.

Further details of the set of data packets 26 generated by agent 16 are considered with respect to FIG. 3.

FIG. 3 illustrates an example of a set of data packets generated by the processor 42. The set of data packets 26 includes data packets 26(1), 26(2), 26(3), . . . . Each of the data packets of the set of data packets 26, for example data packet 26(1), includes a header 82 and a payload 84.

Header 82 includes values of a set of parameters 86 that identifies the data packet 26(1) in terms of the format of its payload content, communications protocol, as well as other parameter values. For example, a specification instructs the agent to generate data packets having port numbers between 1 and 1024; communications protocols chosen from HTTP, SMTP, and FTP; to be sent over TCP; and in Power-Point (.PPT) and Word (.DOC) formats. Processor 42 (see FIG. 2a) stores the values of the set of parameters referred to in the generation of a data packet in the header of that data packet. Processor 42 further places the communications channel (e.g., associated with a port number) over which the data packet is to be sent in the header; the specification may also provide a set of communications channels over which the data packets are sent.

Payload 84 includes before filter content 88 that is placed in the payload 84 by the agent; in some arrangements, the payload content 88 is determined by the specification. For some data packets of the set of data packets 26, the payload content 88 includes simulated restricted content. The term "simulated restricted content" refers to the fact that the restricted content to be placed into the data packet payloads is not actual sensitive data, but represents patterns satisfied by the sensitive data. Examples of restricted content include text, pictures, sound and other multimedia that contains patterns that filter 18 is designed to intercept. The specification may also instruct agent 16 as to what types of simulated restricted content is to be placed into the payload 84.

Processor 42 (see FIG. 2a), upon generating the set of data packets 26, sends, via network interface 46, the set of data packets 26 outbound via communications medium 30 using a specified communications protocol corresponding to a port number in each data packet header, e.g., header 82. For example, one data packet 26(1) is to be sent over a communications channel 20a which is associated with port 80 (conventionally HTTP), but is actually sent over port 80 via FTP.

FIG. 3 further illustrates the set of data packets 28 received by network interface 66 (see FIG. 2b) from communications medium 30. The set of data packets 26 goes through filter 18 on its way to network interface 66. Filter 18, as described above, is designed to intercept simulated restricted content from the payloads of the set of data packets 26. In redacting the simulated restricted content it finds, filter 18 transforms, or causes to transform, the set of data packets 26 into the set of data packets 28. Specifically, data packet 26(1) becomes data packet 28(1).

Data packet 28(1) differs from data packet 26(1) in the after filter content 90 of payload 84. If filter 18 has successfully located simulated restricted content in payload 84, then content 90 includes a version of content 88 with the simulated restricted content redacted. Content 90 may also differ from content 88 in other ways, e.g., further redacted material or additional material due to other rules of filter 18.

In some arrangements, processor 42 (see FIG. 2a) sends the set of data packets 26 to a first device outside of the network boundary 32 (see FIG. 1), which in turn sends the set of data packets 28 to a second device outside of the network boundary 32, which is the electronic apparatus 22. For example, suppose that it is suspected that sensitive data is being sent out of network 12 via some level 7 application such as Facebook, IM, or SharePoint under a user account. The agent opens an account within the level 7 application on the first device and directs the agent to send some or all of the data packets 26 to the third party device 112. Listener 24 is then configured to log in to the account from the second device and obtain the data packets from the first device.

In some arrangements, processor 42 sends data packets 26(1), 26(2), 26(3), . . . , to network interface 66 (see FIG. 2b) as each data packet is generated. In other arrangements, processor 42 sends the set of data packets 26 to network interface 66 all at once, after finishing the generation of the set of data packets 26.

Network interface 66 receives the set of data packets 28 via the communications medium 30 over the specified communications channels 20; in the case that the agent sends the set of data packets 26 all at once, the set of data packets 28 is stored in a storage device 76 (see FIG. 2). Listener 24 accesses the payload content of each data packet; for example, content 90 of data packet 28(1).

It should be understood that listening engine 70 in memory 64 (see FIG. 2b) has access to the set of data packets 26 generated by processor 42. For example, memory 64 also includes a copy of agent software 50 which generates the set of data packets 26 in precisely the same manner as electronic device 14.

For each data packet 28(1), 28(2), 28(3), . . . , of the set of data packets 28, processor 62, via listening engine 70 (see FIG. 2b), accesses the data packet of the set of data packets 26 (e.g., 26(1), 26(2), 26(3), . . . , respectively) having an equivalent set of parameter values 86 in their respective header 82. Processor 62 then compares the payload content, e.g., 88 and 90 of each of the two data packets, e.g., 26(1) and 28(1) and determines, as an analysis result, whether there is a difference between the content 90 and the content 88. Processor 62 then logs the analysis result into a database 78 residing on the storage device 76 (see FIG. 2), along with the set of parameter values of the data packets.

It should be understood that filter 18 may also completely intercept a data packet of the set of data packets 26. In this case, for such a data packet, there will be no counterpart in the set of data packets 28, and processor 62, via listening engine 70, will note such a case accordingly in the database 78.

Once processor 70 has performed the analysis operation on all of the data packets of the set of data packets 28, processor 70, via reporting engine 72, reads the analysis results from the database 78. From the analysis results, processor 70 assembles a report to send to, e.g., an administrator of network 12 in order to communicate the state of the security of network 12.

It should be understood that a port number and protocol associated with a communications channel, e.g., 20a, may not be the same as a protocol number stored in the header 82 of data packet 26(1). Such a port protocol mismatch is intentional: many fraudsters attempt to hide sensitive data through such misdirection. Details of the effects of sending data packets via mismatched ports are shown with respect to FIG. 4.

Figure 4:
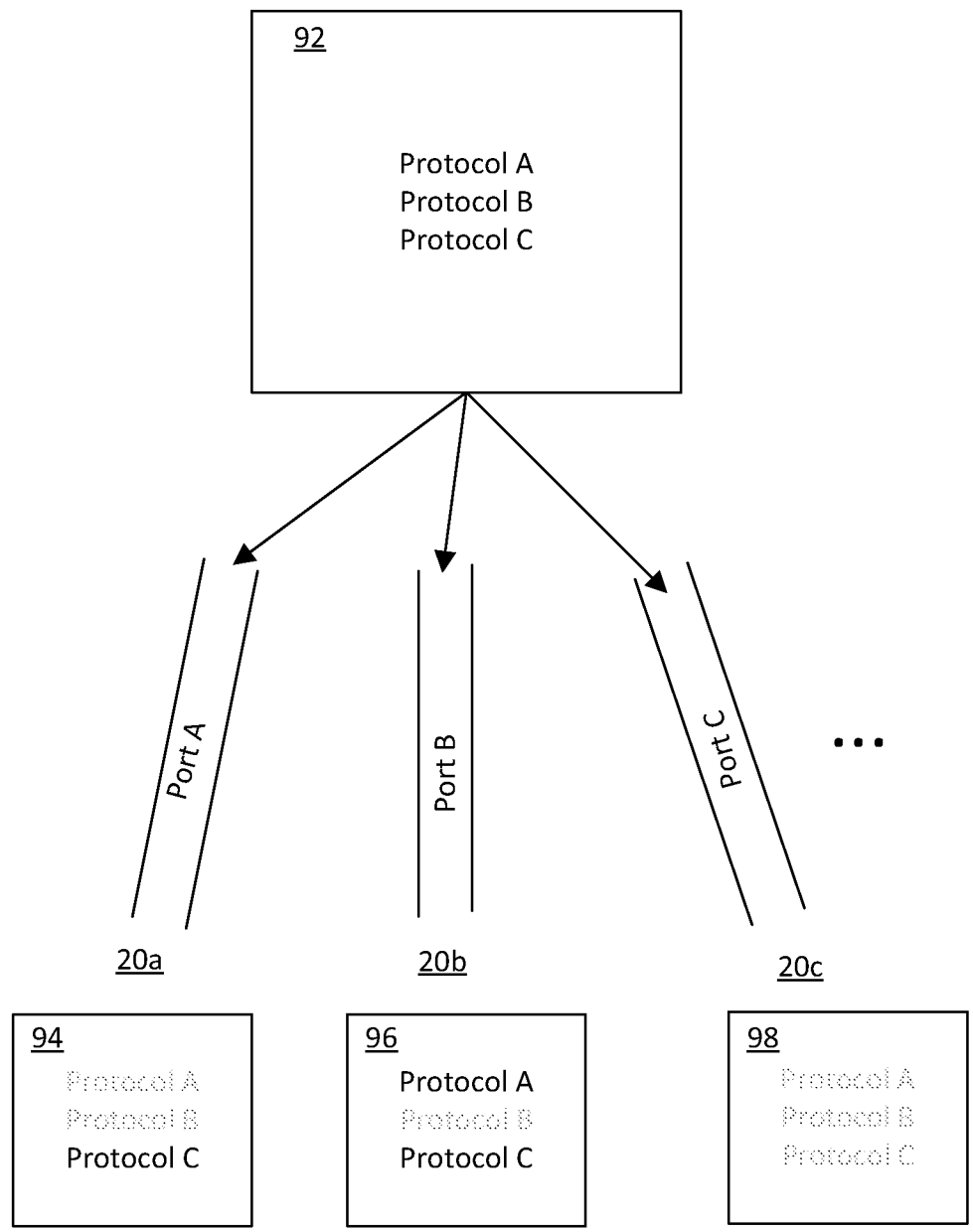
FIG. 4 is a diagram illustrating a set of communications channels within the electronic environment shown in FIG. 1.

FIG. 4 illustrates data packets 92 containing simulated restricted content that are to be sent over a set of communications channels 20a, 20b, 20c, . . . , via a set of various communications protocols, e.g., Protocol A, Protocol B, Protocol C. For example, Protocol A is HyperText Transfer Protocol, Protocol B is File Transfer Protocol, and Protocol C is Simple Mail Transfer Protocol. In addition, each communications channel 20a, 20b, 20c, is associated with a particular port number representing a communications protocol. For example, communications channel 20a is associated with Port A (for example TCP Port 80, conventionally HyperText Transfer Protocol), communications channel 20b is associated with Port B (for example TCP Port 21, conventionally File Transfer Protocol), and communications channel 20c is associated with Port C (for example TCP Port 66, conventionally Oracle SQL). A communications channel is associated with a particular communications protocol when the expected protocol by which data packets are sent over that communications channel is the particular communications channel. The improved technique ignores these conventional pairings of protocols and ports generating sets of data traffic.

There may be difficulties for filter 18 (see FIG. 3) to detect content in data packets being sent via mismatched ports. Such a difficulty is represented in FIG. 4 by the results 94, 96, and 98 of sending the data packets 92 over the communications channels 20a, 20b, 20c, respectively. Result 94 of sending data packets 92 over communications channel 20a which is associated with Port A results in the simulated restricted content in data packets sent via Protocol A and Protocol B being redacted, while that sent via Protocol C was not redacted. That is, sensitive data sent over communications channel 20a via Protocol C was able to get past filter 18. In such a scenario, a report sent to an administrator would point out this vulnerability of network 12 (see FIG. 1). Similarly, result 94 shows data packets sent over communications channel 20b via Protocol A and Protocol C got past filter 18 without simulated restricted content being redacted, and result 96 shows that all of the three data packets 92 have simulated restricted content redacted.

Figure 5:
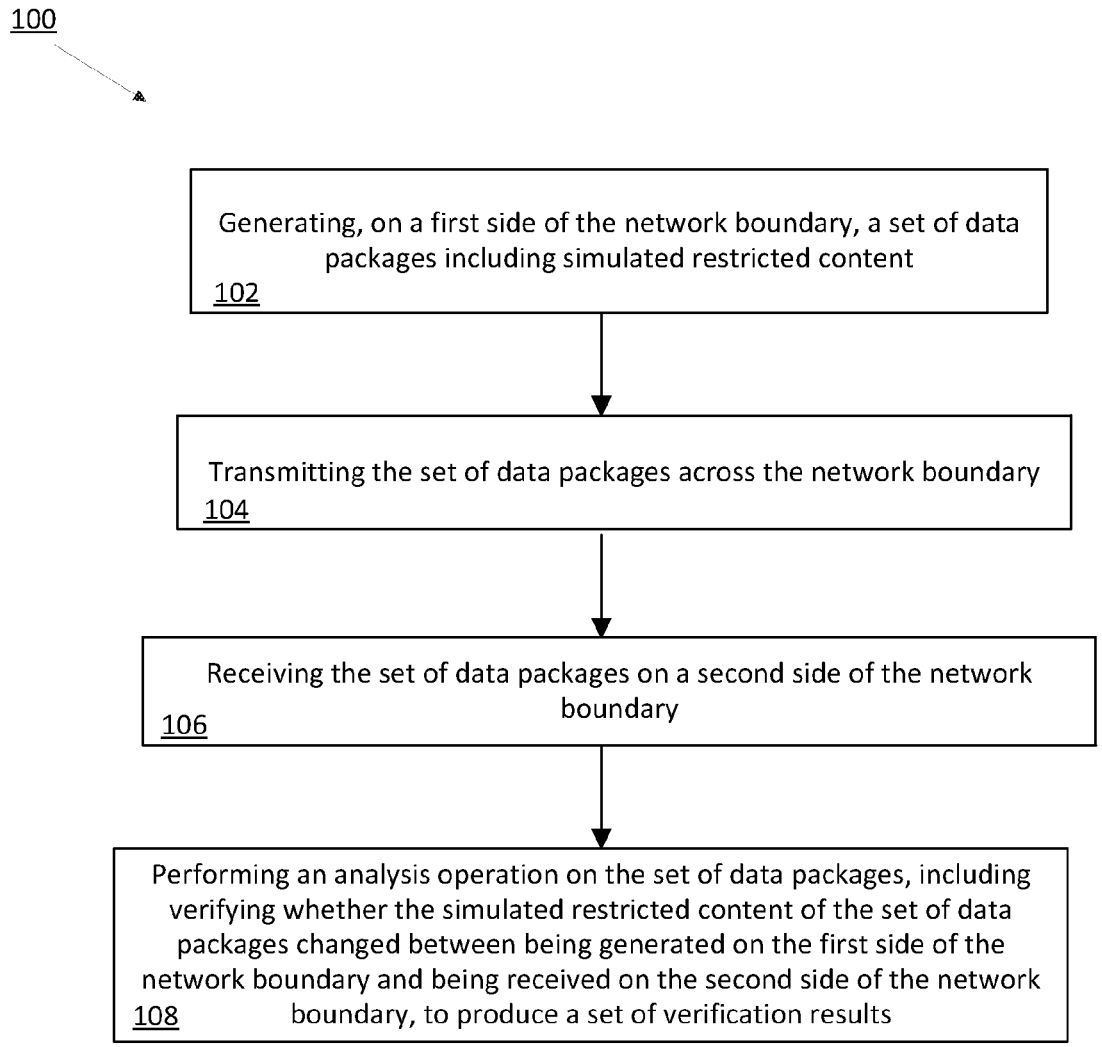
FIG. 5 is a flow chart illustrating a method of carrying out the improved technique within the electronic environment shown in FIG. 1.

FIG. 5 illustrates a method 100 of testing a network boundary for vulnerabilities to outbound traffic. In step 102, a set of data packages which include simulated restricted content are generated on a first side of the network boundary. In step 104, the set of data packages are transmitted across the network boundary. In step 106, the set of data packages are received on a second side of the network boundary. In step 108, an analysis operation is performed on the set of data packages, including verifying whether the simulated restricted content of the set of data packages changed between being generated on the first side of the network boundary and being received on the second side of the network boundary, to produce a set of verification results.

While various embodiments of the invention have been particularly shown and described, it will be understood by those skilled in the art that various changes in form and details may be made therein without departing from the spirit and scope of the invention as defined by the appended claims.

For example, data packets have been described as having a header and payload. When the agent 16 sends the data packet out under TCP or ICMP over a communications channel 20a, the electronic device automatically receives an acknowledgment of receipt over communications channel 20a. On the other hand, when agent 16 sends the data packet out under UDP over communications channel 20a, listener 24 sends an acknowledgement message back to the electronic device 14 over communications channel 20a. The acknowledgment message indicates whether communications channel 20a is open; if communications channel 20a is closed, listener 24, by deducing trends in traffic sent over other communications channels, sends a message to the electronic device 16 that communications channel 20a is closed.

Also, instead of an extra copy of agent 16 being on electronic apparatus 22, listener 22 can access payload and header data to be generated by agent 16 within database 78.

Further, it should be understood that, in order to access payload content of various formats, software configured to access such content is loaded into memory 64 on electronic apparatus 22. For instance, payload content formatted for Microsoft Word™ is accessed by the Microsoft Word™ application. In such a case, processor 62 uses a hash algorithm to determine completeness and consistency on, say, data packet 26(1) and data packet 28(1).

Furthermore, it should be understood that some embodiments are directed to electronic system 10 which is constructed and arranged to test a network boundary for vulnerabilities to outbound traffic. Some embodiments are directed to electronic device 14 and electronic apparatus 22. Some embodiments are directed to a process of testing a network boundary for vulnerabilities to outbound traffic. Also, some embodiments are directed to a computer program product which enables computer logic to test a network boundary for vulnerabilities to outbound traffic.

In some arrangements, electronic device 14 and electronic apparatus 22 are each implemented by a set of processors or other types of control/processing circuitry running software. In such arrangements, the software instructions can be delivered to electronic device 14 and electronic apparatus 22 in the form of a computer program product 110 (see FIG. 2a and FIG. 2b) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. In an electronic system, a method of testing a network boundary for vulnerabilities to outbound traffic, comprising:
generating, on a first side of the network boundary, a set of data packages including simulated restricted content, each data package of the set of data packages including a port number of a set of port numbers, a communications protocol of a set of communications protocols, and an application protocol of a set of application protocols, each combination of port number, communications protocol, and application protocol defining a communications channel of a set of communications channels, each port number of the set of port numbers forming a pair of an Internet Assigned Numbers Authority (IANA) assigned common port number and application protocol with a corresponding application protocol of the set of application protocols;
for each data package of the set of data packages, transmitting that data package across the network boundary over the communications channel defined by the combination of the port number, the communications protocol, and the application protocol of that data package;
receiving the set of data packages by a listener on a second side of the network boundary, application protocol services of the listener being configured to communicate with the communications channels defined by combinations of port numbers, communications protocols, and application protocols of the transmitted data packages; and
performing an analysis operation on the set of data packages, including verifying whether the simulated restricted content of the set of data packages changed between being generated on the first side of the network boundary and being received on the second side of the network boundary, to produce a set of verification results;
wherein generating includes:
assigning a combination of the port numbers of the set of port numbers, communications protocols of the set of communications protocols, and application protocols of the set of applications protocols to the set of data packages, each possible combination of the port numbers and the communications protocols being assigned to at least one data package;

wherein the set of verification results includes information indicating a mapping between i) changes in the simulated restricted content of each data package and ii) differences between the port number and application protocol of the communications channel over which that data package was sent and the pair of the IANA assigned common port number and the application protocol formed by the port number of that communications channel; and wherein performing the analysis operation further includes, for each data package of the set of data packages:

comparing the simulated restricted content of that data package to an expected simulated restricted content for that data package to produce a comparison result; and logging the comparison result in a reporting database.

2. The method according to claim 1, wherein performing the analysis operation further includes, for each data package of the set of data packages:

comparing the port number and application protocol of the communications channel over which the data package was sent to the common port number and the application protocol formed by the port number of that communications channel to produce a comparison result; and logging the comparison result in the reporting database.

3. The method according to claim 1, wherein the set of communications protocols includes at least one of TCP, UDP, and ICMP, wherein the communications channel is associated with an application layer, and wherein transmitting that data package across the network boundary over the communications channel further includes sending that data package via one of TCP, UDP, and ICMP.

4. The method according to claim 3, wherein the data package is sent across the network boundary via the UDP communications protocol, and wherein transmitting that data package across the network boundary over the communications channel further includes receiving, from the second side of the network boundary, an acknowledgment message indicating whether the communications channel is open or closed.

5. The method according to claim 1, wherein the simulated restricted content is provided within a payload of the data package, wherein the set of parameters includes a designator for a payload format, wherein the designated payload format is compatible with a software application installed on the second side of the network boundary, wherein generating the set of data packages further includes:

receiving, on the first side of the network boundary and from the second side of the network boundary, a message indicating a set of payload formats to assign to headers of the data packages to be generated; and for each data package of the set of data packages, adding the simulated restricted content to the payload in a payload format of the set of payload formats, and wherein receiving the set of data packages on the second side of the network boundary includes:

for each data package of the set of data packages, reading the payload format from the header of the data package; and accessing the payload using the software application.

6. The method according to claim 5, performing the analysis operation further includes, for a data package of the set of data packages:

comparing the simulated restricted content of that data package with expected simulated restricted content for that data packet to produce a comparison result; and logging the comparison result and the payload format in a reporting database.

7. The method according to claim 1, wherein receiving the set of data packages on the second side of the network boundary includes:

obtaining the set of data packages by a first device on the second side of the network boundary, and wherein performing the analysis operation on the set of data packages includes:

analyzing the set of data packages by the listener on the second side of the network boundary.

8. The method according to claim 7, wherein the first device runs a layer 7 application which is configured to process the set of data packages within a user account, and wherein obtaining the set of data packages by the first device on the second side of the network boundary includes:

logging in to the user account; and sending, upon processing the set of data packages within the user account, the set of data packages to the second device.

9. An electronic system constructed and arranged to test a network boundary for vulnerabilities to outbound traffic, comprising:

an electronic device on a first side of the network boundary, including:

a storage device;

a network interface;

a memory; and a controller including controlling circuitry coupled to the memory, the controlling circuitry being constructed and arranged to:

generate, on a first side of the network boundary, a set of data packages including simulated restricted content, each data package of the set of data packages including a port number of a set of port numbers, a communications protocol of a set of communications protocols, and an application protocol of a set of application protocols, each combination of port number, communications protocol, and application protocol defining a communications channel of a set of communications channels, each port number of the set of port numbers forming a pair of an Internet Assigned Numbers Authority (IANA) assigned common port number and application protocol with a corresponding application protocol of the set of application protocols;

for each data package of the set of data packages, that data package across the network boundary over the communications channel defined by the combination of the port number, the communications protocol, and the application protocol of that data package; and an electronic apparatus on a second side of the network boundary, including:

a network interface;

a memory; and a controller including controlling circuitry coupled to the memory, the controlling circuitry being constructed and arranged to:

receive the set of data packages by a listener on a second side of the network boundary, application protocol services of the listener being configured to communicate with the communications channels defined by combinations of port numbers, communications protocols, and application protocols of the transmitted data packages; and perform an analysis operation on the set of data packages, including verifying whether the simulated restricted content of the set of data packages changed between being generated on the first side of the network boundary and being received on the second side of the network boundary, to produce a set of verification results;

wherein generating includes:
assigning a combination of the port numbers of the set of port numbers, communications protocols of the set of communications protocols, and application protocols of the set of applications protocols to the set of data packages, each possible combination of the port numbers and the communications protocols being assigned to at least one data package;

wherein the set of verification results includes information indicating a mapping between i) changes in the simulated restricted content of each data package and ii) differences between the port number and application protocol of the communications channel over which that data package was sent and the pair of the IANA assigned common port number and the application protocol formed by the port number of that communications channel; and wherein performing the analysis operation further includes, for each data package of the set of data packages:
comparing the simulated restricted content of that data package to an expected simulated restricted content for that data package to produce a comparison result; and
logging the comparison result in a reporting database.

10. The electronic system according to claim 9, wherein the simulated restricted content is provided within a payload of the data package,
wherein the set of parameters includes a designator for a payload format, wherein the designated payload format is compatible with a software application installed on the second side of the network boundary,
wherein generating the set of data packages further includes:
receiving, on the first side of the network boundary and from the second side of the network boundary, a message indicating a set of payload formats to assign to headers of the data packages to be generated; and
for each data package of the set of data packages, adding the simulated restricted content to the payload in a payload format of the set of payload formats, and
wherein receiving the set of data packages on the second side of the network boundary includes:
for each data package of the set of data packages, reading the payload format from the header of the data package; and
accessing the payload using the software application.

11. The electronic system according to claim 10, wherein performing the analysis operation further includes, for a data package of the set of data packages:
comparing the simulated restricted content of the that data package with expected simulated restricted content for the that data packet to produce a comparison result; and
logging the comparison result and the payload format in a reporting database.

12. A computer program product having a non-transitory, computer-readable storage medium which stores code to test a network boundary for vulnerabilities to outbound traffic, the code including instructions to:
generate, on a first side of the network boundary, a set of data packages including simulated restricted content, each data package of the set of data packages including a port number of a set of port numbers, a communications protocol of a set of communications protocols, and an application protocol of a set of application protocols, each combination of port number, communications protocol, and application protocol defining a communications channel of a set of communications channels, each port number of the set of port numbers forming a pair of Internet Assigned Numbers Authority (IANA) assigned common port number and application protocol with a corresponding application protocol of the set of application protocols;

for each data package of the set of data packages, transmit that data package across the network boundary over the communications channel defined by the combination of the port number, the communications protocol, and the application protocol of that data package;

receive the set of data packages by a listener on a second side of the network boundary, application protocol services of the listener being configured to communicate with the communications channels defined by combinations of port numbers, communications protocols, and application protocols of the transmitted data packages; and perform an analysis operation on the set of data packages, including verifying whether the simulated restricted content of the set of data packages changed between being generated on the first side of the network boundary and being received on the second side of the network boundary, to produce a set of verification results;

wherein generating includes:
assigning a combination of the port numbers of the set of port numbers, communications protocols of the set of communications protocols, and application protocols of the set of applications protocols to the set of data packages, each possible combination of the port numbers and the communications protocols being assigned to at least one data package;

wherein the set of verification results includes information indicating a mapping between i) changes in the simulated restricted content of each data package and ii) differences between the port number and application protocol of the communications channel over which that data package was sent and the pair of the IANA assigned common port number and the application protocol formed by the port number of that communications channel; and wherein performing the analysis operation further includes, for each data package of the set of data packages:
comparing the simulated restricted content of that data package to an expected simulated restricted content for that data package to produce a comparison result; and
logging the comparison result in a reporting database.

13. Method as in claim 1,
wherein the outbound traffic for which the network boundaries are tested for vulnerabilities includes data packages of the set of data packages;

wherein the network boundary includes a firewall configured to intercept data packages of the set of data packages that contain specified content; and wherein transmitting that data package across the network boundary includes:

sending the data packets to the firewall.

14. The method as in claim 13, further comprising:
configuring the firewall based on the set of verification results.

15. The method as in claim 1, wherein a Demilitarized Zone (DMZ) network straddles the network boundary; and
wherein sending that data package to the firewall includes transmitting that data package to the DMZ network.

* * * * *

UNITED STATES PATENT AND TRADEMARK OFFICE
CERTIFICATE OF CORRECTION

PATENT NO. : 8,887,284 B2  
APPLICATION NO. : 13/370716  
DATED : November 11, 2014  
INVENTOR(S) : Matthew Kovar and Joseph Bai Page 1 of 1

It is certified that error appears in the above-identified patent and that said Letters Patent is hereby corrected as shown below:

In the Claims

Claim 11, Column 13, Line 65, "the that data" should read --that data--.
Claim 11, Column 13, Line 67, "the that data" should read --that data--.

Signed and Sealed this
Tenth Day of March, 2015

Michelle K. Lee
*Deputy Director of the United States Patent and Trademark Office*